United States Patent [19]
DeRees et al.

[11] 4,036,522
[45] July 19, 1977

[54] VEHICLE BODY ROOF CONSTRUCTION

[75] Inventors: Delbert D. DeRees, Utica, Mich.; Jacques Emile Pinsonneault, Windsor, Canada

[73] Assignee: American Motors Corporation, Detroit, Mich.

[21] Appl. No.: 673,174

[22] Filed: Apr. 2, 1976

[51] Int. Cl.² .............................................. B60J 9/00
[52] U.S. Cl. .................................. 296/154; 296/137 R
[58] Field of Search ................. 296/28 R, 154, 137 R, 296/106, 137 A, 76, 146

[56] References Cited

U.S. PATENT DOCUMENTS

| | | | |
|---|---|---|---|
| 2,926,402 | 3/1960 | Styron | 296/106 |
| 3,326,599 | 6/1967 | Pashenee | 296/28 R X |
| 3,526,426 | 9/1970 | Wessells | 296/28 R |
| 3,596,980 | 8/1971 | Cadiou | 296/154 |
| 3,711,147 | 1/1973 | Higuchi | 296/28 R |
| 3,794,376 | 2/1974 | Barenyi | 296/137 R |
| 3,833,254 | 9/1974 | Renner | 296/137 R |
| 3,938,856 | 2/1976 | Janssen | 296/154 |

Primary Examiner—Joseph F. Peters, Jr.
Assistant Examiner—John A. Carroll
Attorney, Agent, or Firm—Reising, Ethington, Barnard, Perry and Brooks

[57] ABSTRACT

A vehicle body roof construction of the disclosure includes an improved edge structure adjacent closure members thereof such as a side door or rear tailgate and also includes an improved pillar structure for supporting a roof panel whose edge portions are stamped to define integrally connected flanges that constitute components of the improved roof edge structure. At the side and rear edge portions of the roof panel, roof inner members have extreme outer edges secured to extreme outer edges of the roof panel so as to cooperate therewith in providing a side roof rail and a tailgate header that define the upper extremities of side door and tailgate openings, respectively. An associated side door and a tailgate are mounted for movement between open and closed positions and include upper window frames that overlie the adjacent roof panel edge portion in their closed position. Pillars support the side edge portion of the roof panel at its juncture with the rear and front edge portions of the roof panel. Each pillar includes inner and outer members that define an enclosed chamber and include first and second portions that project along the adjacent front or rear edge portion and the side edge portion, respectively. The pillar outer member includes depressions in its projecting portions at a spaced location from the juncture of the roof panel edge portions.

24 Claims, 8 Drawing Figures

VEHICLE BODY ROOF CONSTRUCTION

BACKGROUND OF THE INVENTION

1. Field of the Invention

The present invention relates generally to a vehicle body roof construction, and more particularly to an improved edge structure adjacent associated closure members of the vehicle body and also to an improved pillar structure that supports a roof panel of the roof adjacent the juncture between a side edge portion thereof and a front or rear edge portion thereof.

2. Description of the Prior Art

Vehicle body roof constructions incorporate roof panels whose edge portions must be strengthened to provide the roof with the required structural integrity. The roof panel edge portions define the upper extremity of side door and rear tailgate openings in conventional vehicle body constructions. Usually, an upper side door window frame will move under the adjacent roof panel side edge portion upon movement of the associated door to its closed position. An exposed rain gutter is ordinarily secured to the side roof panel edge portion in conventional roof constructions; however, there are roof constructions wherein a concealed side rain gutter is incorporated.

At their edge portions, many conventional roof panels include inwardly and outwardly extending flanges that prevent the roof panels from being stamped by a straight draw process. The orientation of these flanges requires the stamping equipment for fabricating the roof panels to have side dies that are actuated to stamp the edge flanges.

At their side edges, vehicle body roof panels conventionally are supported by a roof rail construction to give the roof panel its required strength. The side rail conventionally includes an inner member and an outer member that may be referred to as a roof rail inner and a roof rail outer. At its longitudinal front edge, a conventional roof panel includes a windshield header that is composed of inner and outer members which may be referred to as a windshield header inner and a windshield header outer. Likewise, the longitudinal rear edge of a vehicle body roof panel for a station wagon is supported by a tailgate opening header that includes inner and outer members which may be referred to as a tailgate header inner and a tailgate header outer.

The juncture between front and side edge portions of a vehicle body roof panel is conventionally supported by a windshield pillar. Likewise, the juncture between side and rear edge portions of a station wagon roof panel is also supported by a pillar. Vehicle roof panel pillars conventionally include inner and outer members that may be referred to as a pillar inner or a pillar outer. Such pillars interconnct the adjacent side rail and windshield or tailgate header to give the roof panel structural integrity about its total periphery. To provide this interconnection, the pillar inner member usually incorporates access holes utilized to permit wleding that secures the pillar members to the roof panel.

The following U.S. patents disclose prior art vehicle body roof constructions: U.S. Pat. Nos. 2,826,447; 2,937,047; 2,941,838; 2,989,338; 2,994,555; 3,198,572; 3,294,436; 3,526,426; and 3,714,751.

SUMMARY OF THE INVENTION

The present invention relates to a vehicle body roof construction having an improved edge structure adjacent one or more edge portions of a roof panel at the upper extremity of a closure member opening and also to an improved pillar structure that supports the roof panel of the roof at the juncture between a side edge portion of the panel and a front or rear edge portion of the panel.

A side edge portion of the roof panel above a side door opening and a rear edge portion of the panel above a rear tailgate opening include integrally connected flanges that extend downwardly and outwardly to give the roof panel structural integrity at its edge portions while still permitting the panel to be stamped by a straight draw process. The side and rear edge portions each include a roof edge inner member which takes the form of a roof rail inner at the side edge portion and a tailgate header inner at the rear edge portion. Extreme outer edges of the roof panel edge portions and the roof edge inner members are secured to each other so as to provide a side roof rail and a rear tailgate header. The roof rail inner cooperates with the side edge portion of the roof panel to provide the side roof rail while the tailgate header inner cooperates with the rear edge portion to provide the tailgate header. Upper window frames of the side door and the tailgate respectively overlie the flanged side and rear roof panel edge portions with seals extending therebetween to provide sealing of the associated opening as well as providing a concealed rail gutter.

The pillar structure of the vehicle body roof construction includes a pillar located at the juncture of the side roof panel edge portion with the front and rear edge portions of the roof panel. Each pillar includes inner and outer pillar members that cooperate to define an enclosed chamber as well as projecting portions that extend along the adjacent longitudinal edge portion of the roof and the adjacent end of the side edge portion in generally perpendicular directions from the juncture of these edge portions. Depressions in the projecting portions of the pillar members close the cross sections of the projecting pillar portions and enable the pillar inner and outer members to be welded to each other so as to permit interconnection of the side roof rail and an adjacent header without any welding access holes in the pillar members.

In the preferred embodiment of the vehicle body roof construction disclosed, the upper window frame of the side door carries a resilient seal that engages the roof panel side edge portion to provide the formation of the concealed rail gutter as well as the sealing of the side door opening. A second seal below the other one is mounted on the roof panel side edge portion and provides a backup rain gutter and sealing of the opening.

The roof panel side edge portion extends between the rear pillar and the rear side of the side door opening and defines the upper extremity of a side window opening. A close-out panel covers the roof panel side edge portion above the side window to give the roof panel an aesthetically appealing appearance and to also cooperate with flanges of the roof panel side edge portion and the roof rail inner in providing strength to the side edge portion.

The pillar outer member of the preferred roof construction disclosed completely encircles the front windshield opening and includes the depressions which enable the pillar outer member to be secured to the pillar inner member. The portion of the pillar outer member above the windshield opening functions as the windshield header inner so as to cooperate with the front roof panel edge portion to provide a windshield header. The rearwardly projecting portions of the front pillar members are welded to the front end of the side roof rail provided by the side roof panel edge portion and the roof rail inner so that the pillar provides a high strength interconnection between the windshield header and the side rail. Likewise, the forwardly projecting portions of the rear pillar members are welded to the rear end of the side roof rail to interconnect the rear tailgate header and the side rail in a high strength manner.

The objects, features and advantages of the present invention are readily apparent from the following detailed description of the preferred embodiment taken in connection with the accompanying drawings.

DETAILED DESCRIPTION OF THE PREFERRED EMBODIMENT

Figure 1:
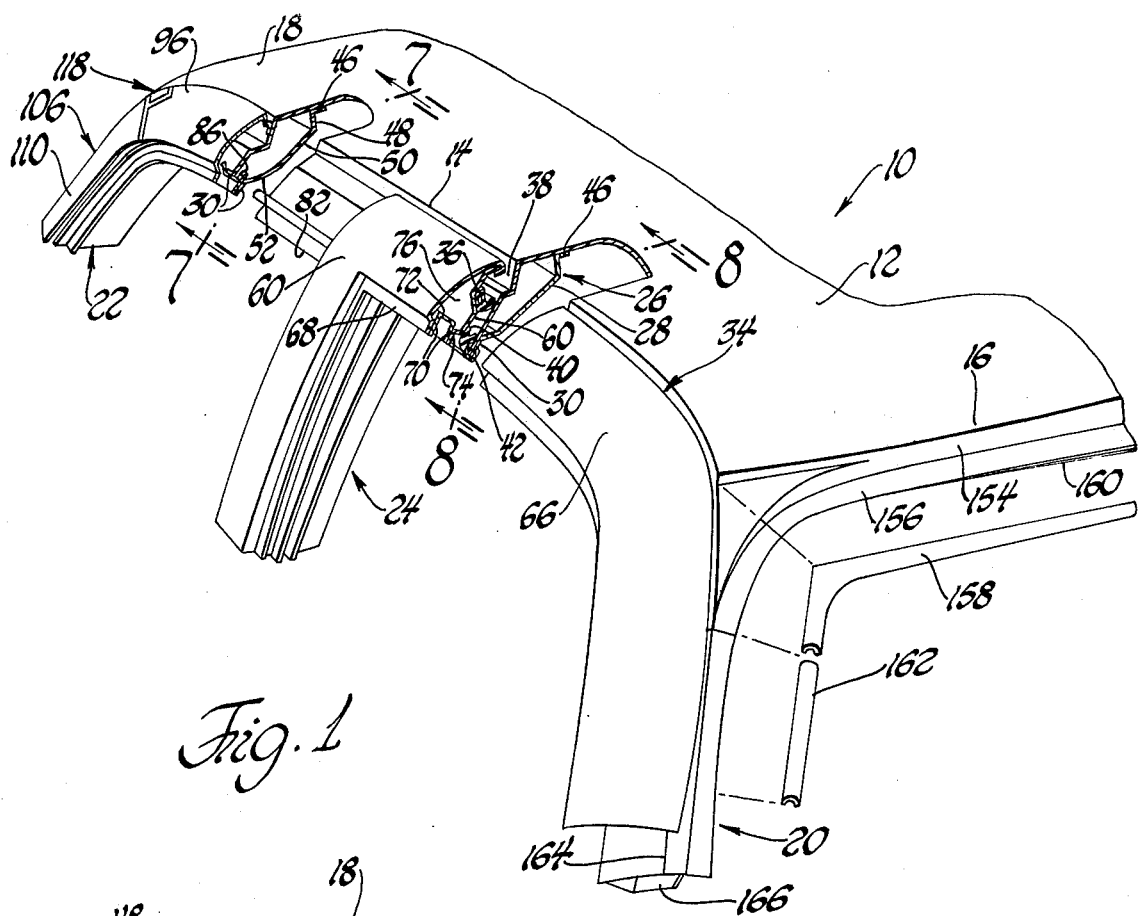
FIG. 1 is a partial perspective view looking downwardly and rearwardly at a vehicle body roof construction that embodies the present invention, with an upper window frame of a side door of the vehicle body shown in a closed position.
Figure 2:
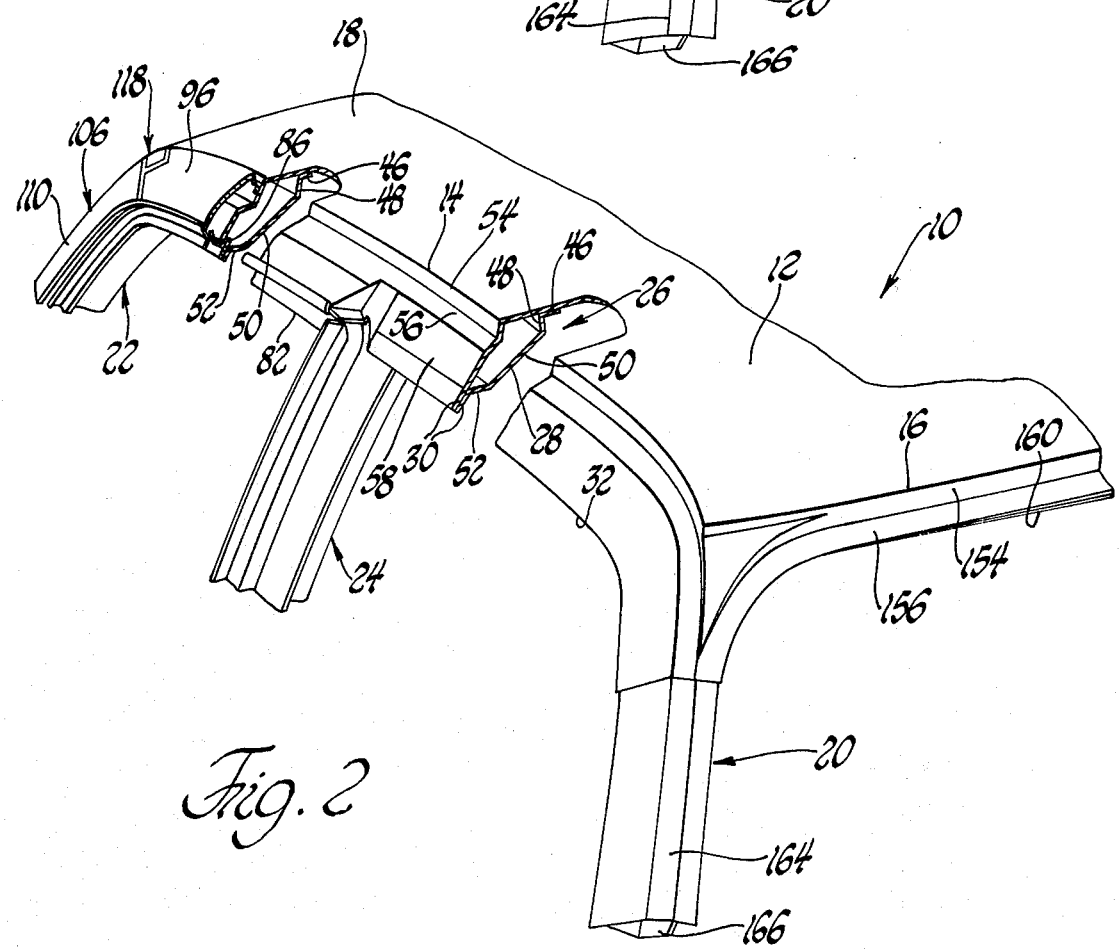
FIG. 2 is a perspective view similar to FIG. 1 but with the window frame removed.
Figure 3:
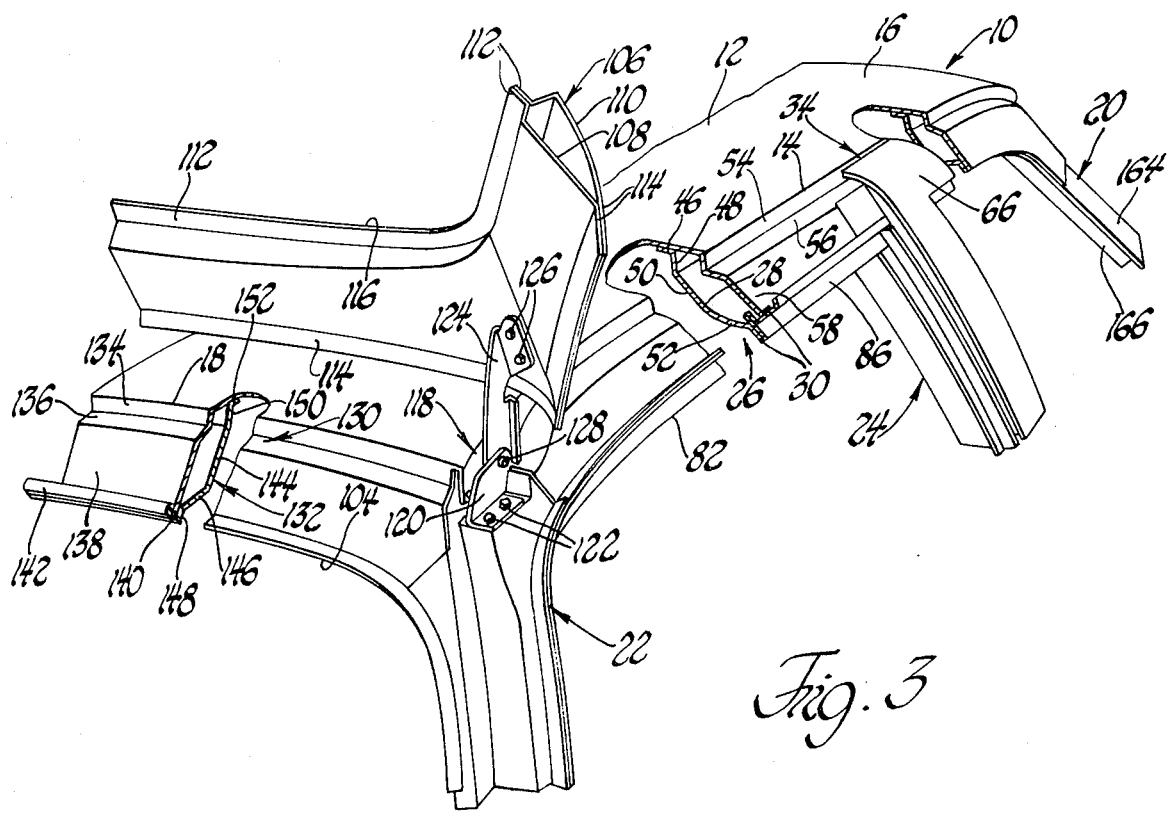
FIG. 3 is a perspective view looking forwardly and downwardly at the roof construction and showing an upper window frame of a rear tailgate moved to an open position in a lift gate mode.

With reference to FIGS. 1 and 2 of the drawings, a vehicle body roof construction generally indicated by 10 embodies the present invention and includes a roof panel 12 fabricated from steel by a stamping operation. The roof panel 12 includes a flanged side edge portion 14, a flanged front edge portion 16, and a flanged rear edge portion 18 (FIG. 3). These edge portions 14, 16 and 18 have outwardly and downwardly extending orientations so as to permit the roof panel 12 to be stamped with a straight draw process without requiring any secondary side deformation once the main die has stamped the general configuration of the roof panel. The roof panel 12 is supported by a front windshield pillar 20, a rear tailgate pillar 22 and an intermediate door pillar 24. The windshield pillar 20 supports the roof panel at a juncture between the side and front edge portions 14 and 16 of the roof panel, while the rear pillar 22 supports the roof panel at a juncture between the side and rear edge portions 14 and 18 and the door pillar 24 supports the side edge portion intermediate the front and rear pillars.

Figure 8:
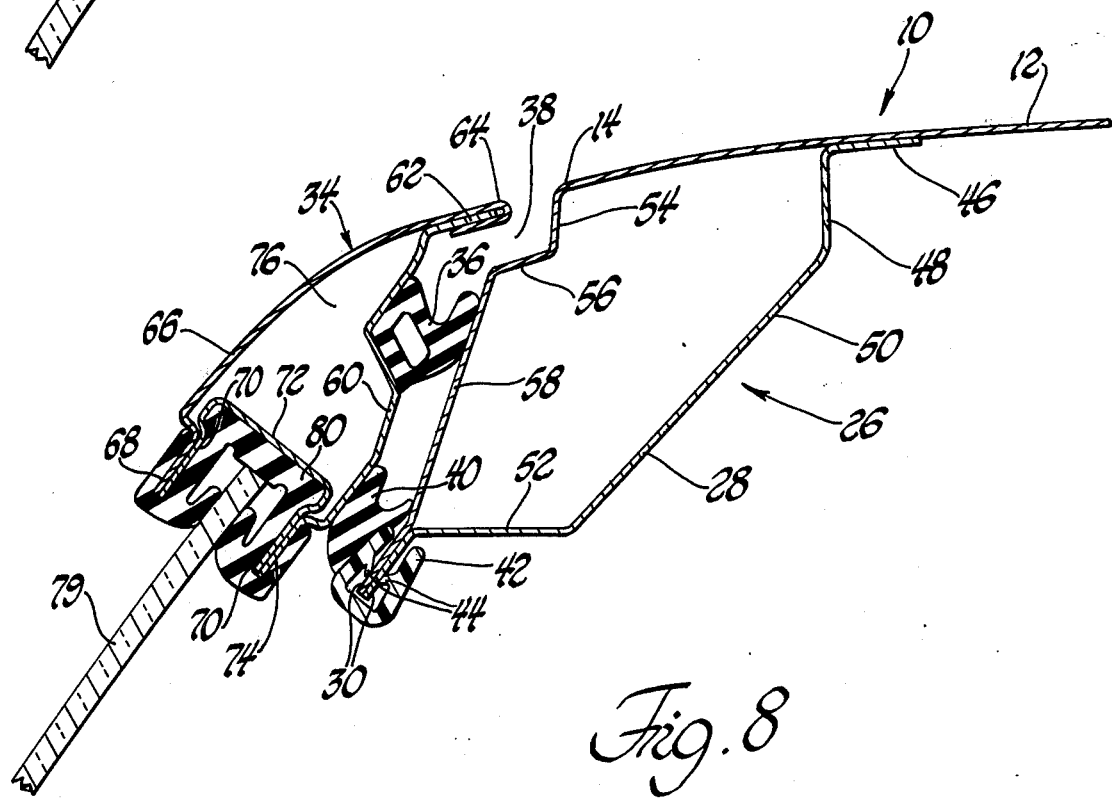
FIG. 8 is a sectional view of the roof construction taken along line 8—of FIG. 1 through the side edge portion thereof and the upper window frame of the side door, and shows the construction thereof in somewhat greater detail.

A side roof rail 26, FIGS. 1–3 and 5, is provided by a roof edge inner member or rail inner 28 that cooperates with the flanged side roof panel edge portion 14 to define an enclosed cross section. The flanged roof panel edge portion 14 and the roof rail inner 28 include extreme outer edges 30 that are welded to each other and define the upper extremity of a side door opening 32, FIG. 2, between the front pillar 20 and the door pillar 24. An upper window frame 34 of a side door that is mounted for movement between open and closed positions with respect to the door opening 32 overlies the outer side of the flanged roof panel side edge portion 14 in its closed position. As seen in FIG. 8, an upper seal 36 mounted on the window frame 34 engages the outer side of the roof panel side edge portion 14 so as to cooperate therewith in sealing the side door opening and providing a concealed rain gutter 38. A lower seal 40 is supported on a molding 42 mounted on the roof rail 26 and provides a backup rain gutter and sealing of the side door opening. The molding 42 has a U-shaped cross section recieving the welded outer edges 30 of the roof panel edge portion 14 and the roof rail inner 28. Retaining projections 44 of the molding 42 engage the flanges 30 on opposite sides thereof to locate the molding in position.

With continuing reference to FIG. 8, the roof rail inner 28 has inner and outer sides and includes an inboard horizontal flange 46 that supports the lower side of the roof panel 12 inboard from the flanged side edge portion 14. An adhesive may be utilized to secure the upper side of flange 46 to a lower side of the roof panel 12. The outboard edge of flange 46 is bent downwardly to provide a generally vertical flange 48 whose lower end is integrally connected to an inclined main portion 50 of the roof rail inner. The lower side of main portion 50 is bent outwardly to provide a generally horizontal flange 52 whose outboard end is bent to provide the extreme outer edge 30 that is welded to the outer edge 30 of the roof panel edge portion 14. Roof panel 12 has a gently curved contour inboard from its side edge portion 14 where a flange 54 is bent downwardly and slightly outwardly. Another flange 56 of the edge portion 14 has a downwardly and outwardly extending orientation with its inboard side connected to the lower end of flange 54 and its outboard side connected to the upper end of a main flange 58 of edge portion 14. Main flange 58 has a downwardly and somewhat outwardly extending orientation and is bent just slightly at its lower end to provide its outer edge 30 that is welded to the outer edge 30 of roof rail inner 28.

As seen in FIG. 8, the seal 36 that engages the outer side of main flange portion 58 of the roof panel side edge portion is mounted by an inner member 60 of the side door upper window frame 34 within a V-shaped configuration of this inner member. A suitable adhesive may be utilized to secure the seal 36 to the inner window frame member 60. An upper end 62 of the inner window frame member 60 is received within a U-shaped upper end 64 of an outer window frame member 66. The lower end of outer window frame member 66 is bent to form a flange 68 that is welded to one flange 70 of a U-shaped intermediate frame member 72. Another flange 70 of frame member 72 is welded to a bent flange 74 at the lower side of the window frame inner member 60. Window frame members 60, 66 and 72 thus cooperate to define an enclosed chamber 76 and to provide the window frame that overlies the flanged side edge portion 14 of the roof panel in the closed door position. A movable window 79 of this side door has an upper edge that is engaged by a seal 80 mounted on the window frame so as to seal a window opening defined by this frame.

Figure 7:
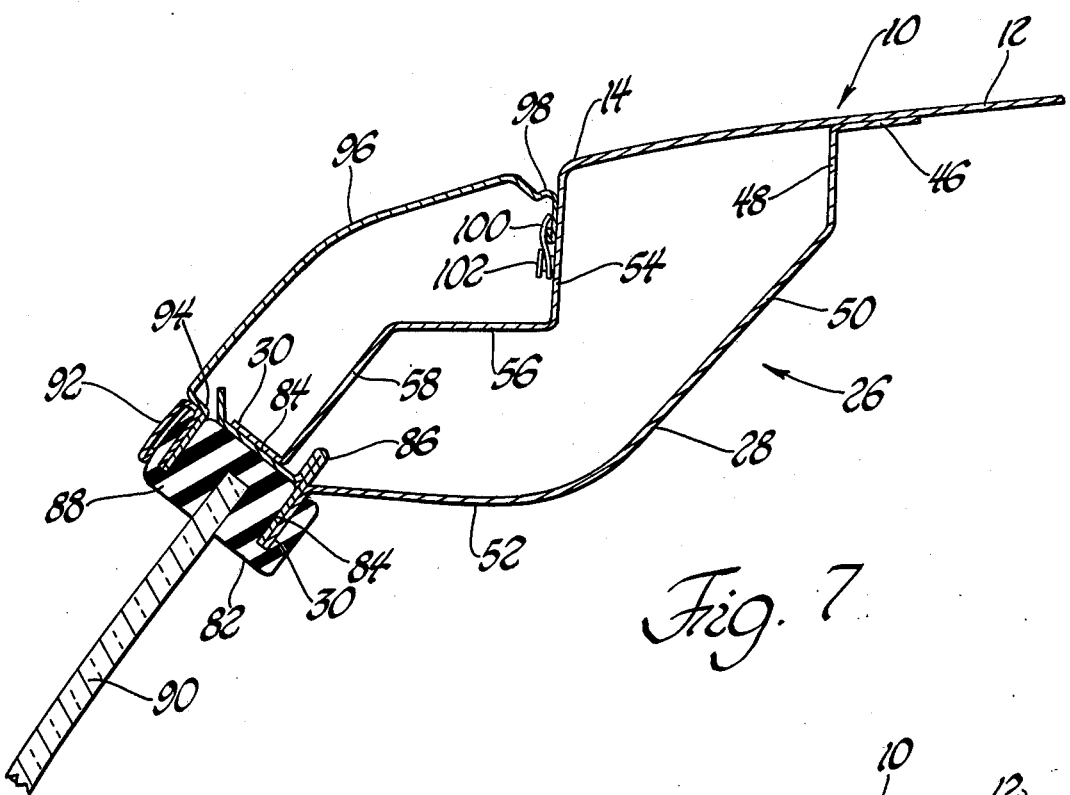
FIG. 7 is a sectional view of the roof construction taken along line 7—7 of FIG. 1 at a side edge portion of the roof construction between the rear pillar and the rear side of the side door opening and shows the construction thereof in somewhat greater detail.

As can be seen in FIGS. 1 and 2, the roof rail 26 defines the upper extremity of a side window opening 82 between the rear pillar 22 and the door pillar 24. The cross section of the roof rail 26 above window opening 82 is slightly modified from the cross section thereof above the door opening 32 as can be seen by comparing FIGS. 7 and 8. For example, as seen in FIG. 7, the main portion 50 and horizontal flange 52 of the roof rail inner 28 are joined by a rounded curve rearward of the door pillar instead of by an abrupt bend as is the case forward of the door pillar. Flanges 54 and 56 of the side roof panel edge portion 14 have greater vertical and horizontal extents, respectively, rearward of the door pillar than they do forward of this pillar. Also, the extreme outer edges 30 of the side roof panel edge portion 14 and the roof rail inner 28 are not secured directly to each other but are welded to respective flanges 84 of an intermediate roof rail member 86. Outer edge 30 of the roof panel edge portion 14 has a downwardly oriented orientation moving in an inboard direction rearward of the door pillar rather than in an outboard direction as is the case forward of the door pillar. Nevertheless, the side roof panel edge portion 14 still has a configuration rearward of the door panel that enables stamping of the roof panel to take place with a straight draw process, as discussed above. A window seal 88 recieves an upper edge of a window 90 which closes the window opening 82 rearward of the door pillar. This window seal is made from hard rubber or plastic and has an outer edge that supports a trim molding 92 as well as supporting the lower flanged end 94 of a close-out panel 96. An upper flanged end 98 of close-out panel 96 is secured by a plurality of clips 100, only one shown, mounted by associated pins 102 on the generally vertical flange 54 of th roof panel side edge portion 14. The close-out panel 96, as can be seen in FIGS. 1 and 4, extends between the door pillar 24 and the tailgate pillar 22.

Figure 4:
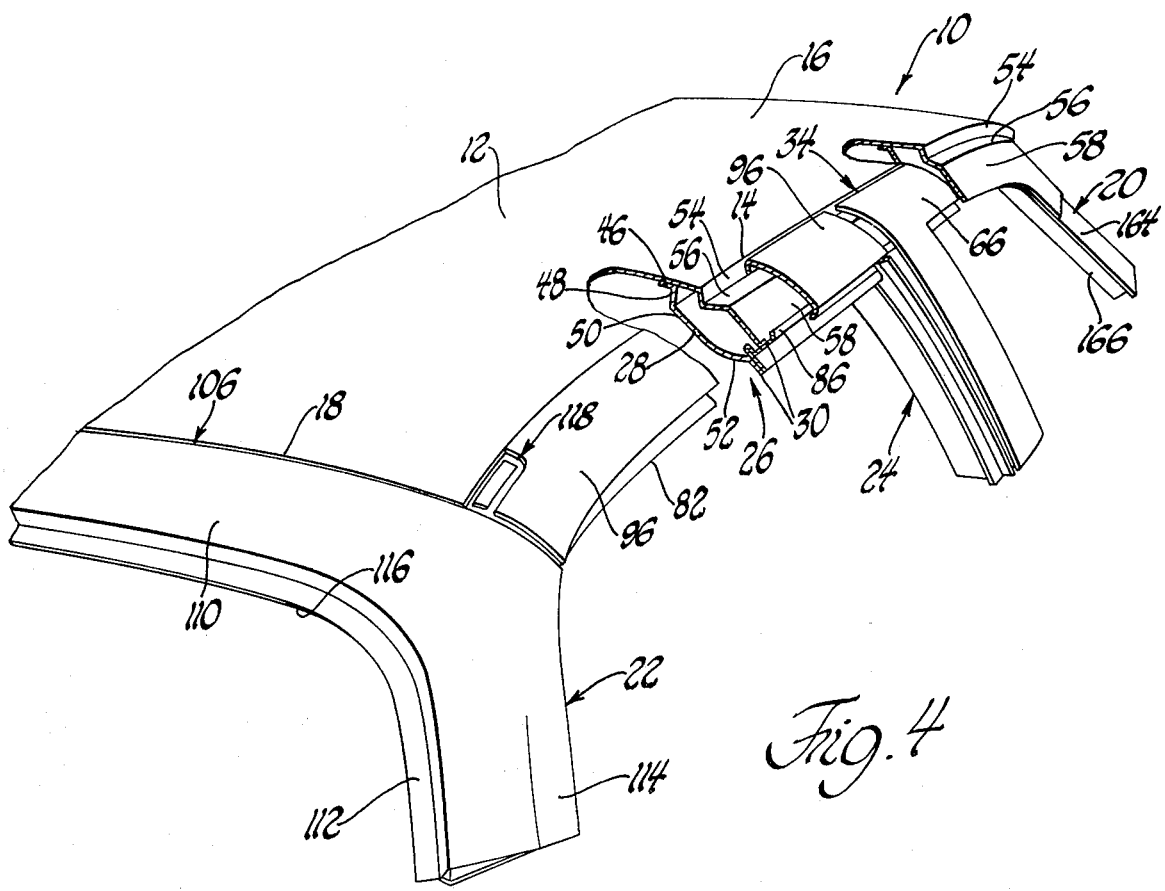
FIG. 4 is a perspective view similar to FIG. 3 but with the window frame of the tailgate shown in its lower closed position.

With reference to FIGS. 3 and 4, the rear edge portion 18 of roof panel 12 defines the upper extremity of a tailgate opening 104 that is selectively opened and closed by a tailgate, shown only partially, having an upper window frame 106. This window frame includes inner and outer frame members 108 and 110 that have interengaged flanges 112 and 114 welded to each other. The flanges 112 define a window opening 116 while the flanges 114 define the outer extremity of the window frame. A hinge 118, FIG. 3, is located at each lateral side of the window frame to support the tailgate for movement in a lift gate mode between open and closed positions with respect to the opening 104. Hinge 118 includes a bracket 120 secured to the roof structure by hexhead bolts 122 and a bracket 124 secured to the tailgate window frame 106 by hexhead bolts 126. A pintle pin 128 pivotally interconnects the brackets 120 and 124 to mount the tailgate for movement about a horizontal axis that is transverse with respect to the vehicle body in the conventional lift gate fashion.

With continuing reference to FIGS. 3 and 4, a rear tailgate header 130 defines the upper extremity of the tailgate opening 104 and includes an enclosed cross section defined by the cooperation of the rear roof edge portion 18 and a roof edge inner member or header inner 132. The gently curved contour of roof panel 12 is terminated at the rear roof edge portion which has inner and outer sides and includes a downwardly and slightly rearwardly extending flange 134 whose lower end is connected to a rearwardly and slightly downwardly extending flange 136. A main flange 138 is integrally connected to the rear side of flange 136 and has a downwardly and rearwardly inclined orientation with an extreme outer edge 140 that supports a seal 142. The header inner 132 includes a main portion 144 whose lower edge is connected to a horizontal flange 146 with an extreme outer edge 148 that is welded to the edge 140 of the flanged rear roof edge portion 18. The upper end of header inner main portion 144 is connected to a vertical flange 150 whose upper side is connected to a horizontal flange 152 that extends inwardly and supports the lower side of the roof panel 12 inboard from the flanges of the rear roof panel edge portion 18. Flange 152 may be adhesively bonded to the lower side of the roof panel 12 to interconnect the inboard side of the header inner with the roof panel. It should be noted that all of the flanges of the rear roof panel edge portion 18 like the flanges of the roof panel side edge portion 14 are oriented such that the roof panel 12 can be stamped by a straight draw process without the requirement of any side stamping operation once the main stamping has been done.

Upon movement of the tailgate from its FIG. 3 open position to its FIG. 4 closed position, the inner flange 112 of the upper window frame inner member 106 moves into engagement with the seal 142 mounted on the tailgate header 130. The window frame 106 overlies the tailgate header in this closed position and cooperates with the header and the seal 142 to seal the tailgate opening and to provide a concealed rain gutter between the tailgate header and the window frame.

As seen in FIGS. 1 and 2, the front roof panel edge portion 16 includes a downwardly extending flange 154 whose lower end connects to a forwardly extending flange 156. These flanges are covered by an upper reveal molding 158 that extends along the upper extremity of a windshield opening 160 defined by the front edge of the roof. A pillar reveal molding 162 covers a portion of the front pillar 20 forward of the upper side door window frame 34 at the lateral side of the windshield opening so as to cooperate with the molding 158 in giving the windshield opening an aesthetically appealing appearance.

Figure 5:
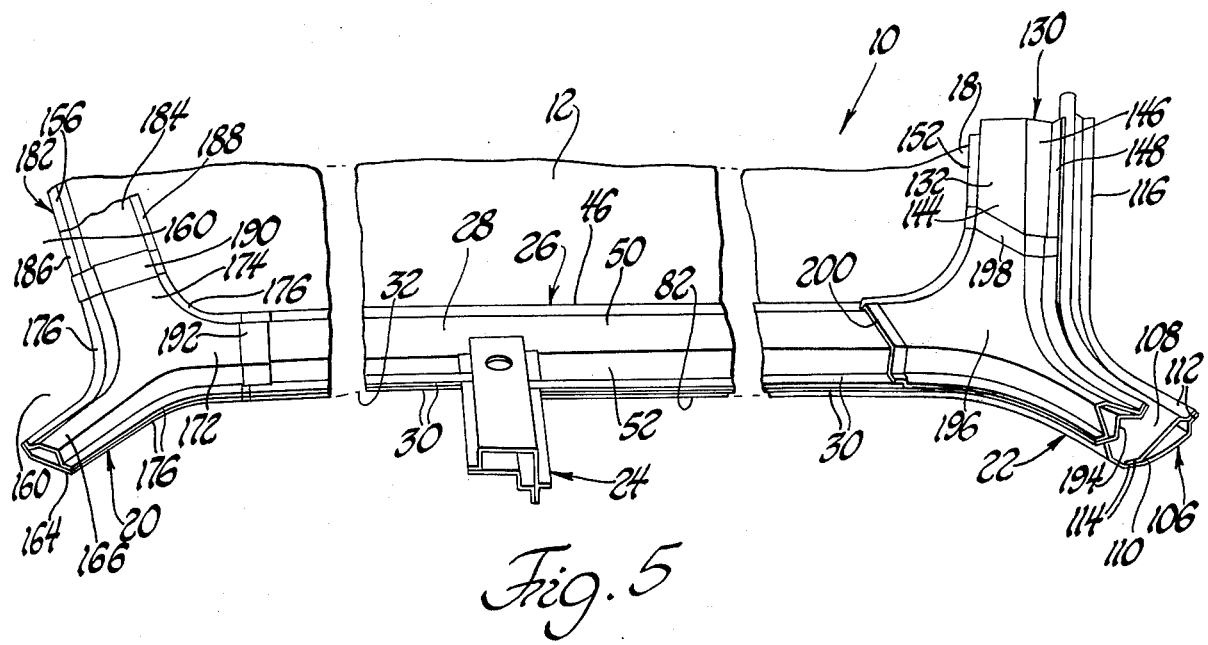
FIG. 5 is a perspective view looking upwardly at the roof construction from inside a passenger compartment defined thereby so as to show pillars that support a roof panel of the roof construction.
Figure 6:
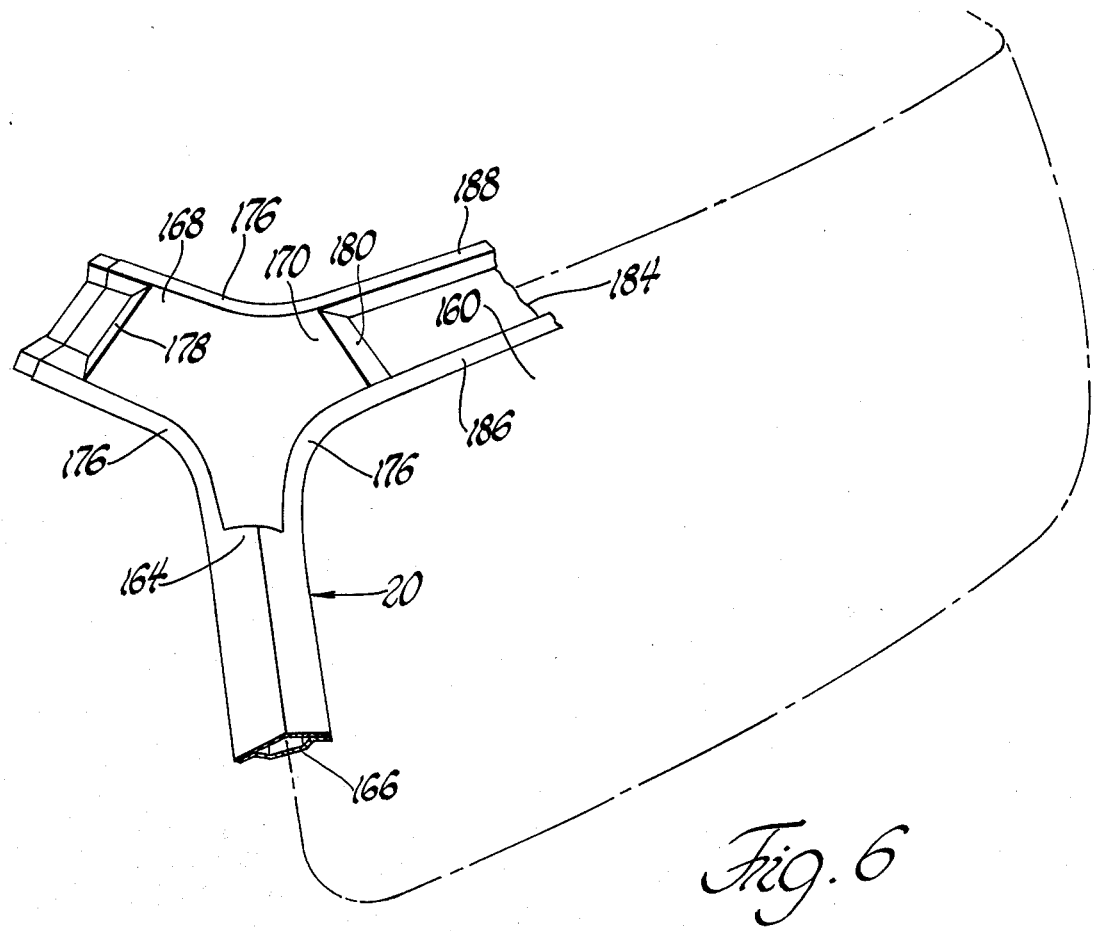
FIG. 6 is a perspective view of the front pillar of the roof construction and is also illustrative in showing the construction of the rear pillar as well.

With additional reference to FIGS. 5 and 6, the front windshield pillar 20 supports the roof panel 12 at the juncture of its side and front edge portions 14 and 16 respectively. Pillar 20 includes a pillar outer member 164 and a pillar inner member 166. The pillar outer member 164 includes a portion 168 that projects along the side roof edge portion toward the side roof rail 26. Another portion 170 of the pillar outer member 164 projects along the front roof edge portion above the windshield opening 160. Similarly, the pillar inner member 166 includes a portion 172, FIG. 5, projecting toward the side roof rail 26 as well as a portion 174 projecting along the front roof panel edge portion 16. The pillar inner and outer members are spaced from each other at their central portions but have interengaged edge flanges 176 that are welded to each other so that the pillar members cooperatively define an enclosed chamber. Depressions 178 and 180 in the outer pillar member, FIG. 6, close the cross section of the projecting pillar portions and enable the pillar inner and outer members to be welded to each other along the total extent of the projecting pillar cross sections. As seen by phantom line representation in FIG. 6, the projecting portion 170 of pillar outer member 164 extends between the opposite sides of the windshield opening at its upper extremity. This projecting pillar cooperates with the front roof panel edge portion 16 to provide a windshield header 182, FIG. 5. Inward from the extreme outboard extremity of the depression 180, this projecting pillar portion functions as a windshield header inner indicated by 184. The header inner includes a front flange 186 that is welded to the flange 156 of the roof panel front edge portion, FIG. 5, and also includes a rear flange 188 that may be adhesively secured to the lower side of the roof panel 12. Reinforcing strips 190 and 192 are utilized to interconnect the pillar inner member with the windshield header 182 and the side roof rail 126. Strip 190 is welded to the projecting portion of the outer pillar member where it defines the windshield header inner 184 and also to the projecting portion 174 of the pillar inner member. Strip 192 is welded to the projecting portion 172 of the pillar inner member and to the forward end of the roof rail inner 28. Also, as seen in FIG. 1, the juncture between the side and front roof panel edge portions covers the upper end of pillar 20 in the assembled condition.

With reference to FIG. 6, the pillar outer member 164 extends completely about the windshield opening 160. At the opposite side of the windshield opening from the pillar 20 shown by solid line representation, another pillar outer member of the opposite hand is defined. This other pillar also includes a pillar inner member as well as the outer member and these members cooperate to interconnect the adjacent roof rail and end of the windshield header.

As seen in FIG. 5, the tailgate pillar 22 also includes pillar outer and inner members 194 and 196. These pillar members include portions that project along the rear roof edge portion 18 and the side roof edge portion 14 in a manner similar to the pillar members of the front windshield pillar 20 previously described. Likewise, the projecting portions of the pillar outer member 194 include depressions that enclose a chamber cooperatively defined thereby with the pillar inner member 196 in the same manner as the front pillar. One projecting portion of the pillar outer member 194 is integrally connected to the header inner 144, FIG. 3, inboard of a welding strip 198 where the inner and outer pillar members are welded to each other. Likewise, a welding strip 200 shown in FIG. 5 is welded to a forwardly projecting portion of the pillar inner member 196 and to the rearward end of the roof rail inner 28 as well as to the pillar member 194.

The pillar inner members 166 and 196 of the front and rear pillars 20 and 22 do not require any welding access holes due to the previously described projecting portions of the pillar members that are interconnected with the adjacent ends of their associated header and the roof rail 26. Thus, a high strength interconnection between the side roof rail 26 and the windshield header 182 and tailgate header 130 is provided.

While a preferred embodiment has herein been described, those skilled in the art will recognize various alternative designs and embodiments for practicing the present invention as defined by the following claims.

What is claimed is:

1. A vehicle body roof construction comprising: a roof panel including a central portion and an edge portion defining the upper periphery of a vehicle body closure member opening; said roof panel edge portion having an inner side and an outer side and including first, second, and third integrally connected flanges which cooperate to give the edge portion a downwardly and outwardly extending configuration with respect to the vehicle body; said flanges having downwardly and outwardly extending orientations so as to permit the roof panel to be stamped by a straight draw process; the first roof panel flange extending downwardly from the central portion of the roof panel, the second roof panel flange extending outwardly from the first flange, and the third roof panel flange extending downwardly and outwardly from the second flange and having an extreme outer edge of the roof panel extending therefrom; a roof edge inner member having first, second, third, and fourth integrally connected flanges and cooperating with the inner side of the roof panel edge portion to define an enclosed cross section; the first inner member flange being secured to the central portion of the roof panel, the second flange of the inner member extending downwardly from the first flange thereof, the third flange of the inner member extending downwardly and outwardly from the second flange thereof, and the fourth flange of the inner member extending outwardly from the third flange thereof and having an extreme outer edge of the inner member projecting therefrom and secured to the extreme outer edge of the roof panel to cooperatively provide edge support to the roof panel; a closure member mounted for movement between open and closed positions with respect to the opening whose upper periphery is defined by the roof panel edge portion; said closure member including a window frame that overlies the outer side of the roof panel edge portion in the closed position; and means extending between the roof panel edge portion and the window frame of the closure member to seal the opening with the closure member in closed position and to also provide a concealed rain gutter.

2. A roof construction according to claim 1 wherein the sealing and gutter providing mans comprises a resilient seal that extends between the window frame and the flanged roof panel edge portion in the closed position.

3. A roof construction as in claim 2 wherein the resilient seal is mounted on the window frame and engaged with the flanged roof panel edge portion as the closure member is moved to its closed position, and a second resilient seal mounted on the extreme outer edges of the roof panel edge portion and the roof edge inner member so as to engage the window frame in the closed position at a location below the other resilient seal and to thereby provide a backup seal and rain gutter.

4. A roof construction as in claim 1 wherein the flanged roof panel edge portion is located at a lateral side of the roof panel, the roof edge inner member being a rail inner and cooperating with the flanged roof panel edge portion to provide a side roof rail, and the closure member being a side door whose window frame overlies the roof rail in the closed position thereof.

5. A roof construction as in claim 4 wherein the roof panel edge portion also defines the upper extremity of a side window opening rearward of the closure member opening, and a closeout panel covering the flanged roof panel edge portion above the side window opening.

6. A roof construction as in claim 5 which includes a flanged member that secures the extreme outer edges of the roof panel edge portion and the rail inner to each other above the window opening, and wherein the extreme outer edges of the roof panel edge portion and the rail inner are welded to each other above the closure member opening.

7. A roof construction as in claim 1 wherein the closure member is a tailgate, the roof edge inner member being a header inner and cooperating with the flanged roof panel edge portion to provide a rear tailgate header.

8. A roof construction as in claim 7 wherein the tailgate includes upper hinges so as to operate in a lift gate mode.

9. A roof construction as in claim 1 wherein the roof edge inner member includes an inner edge that is adhesively bonded to the roof panel.

10. A vehicle body roof construction comprising: a roof panel including a central portion and a side edge portion defining the upper periphery of a side door opening; said side edge portion having inner and outer sides and including first, second, and third integrally connected flanges which cooperate to give the edge portion a downwardly and outwardly extending configuration with respect to the vehicle body; said flanges having downwardly and outwardly extending orientations so as to permit the roof panel to be stamped by a straight draw process; the first roof panel side edge flange extending downwardly from the central portion of the roof panel, the second side edge flange extending outwardly from the first side edge flange, and the third side edge flange extending downwardly and outwardly from the second side edge flange and having an extreme outer edge of the roof panel extending therefrom; a rail inner having first, second, third, and fourth integrally connected flanges for cooperating with the flanged edge portion to define an enclosed cross section and provide a side roof rail; the first rail inner flange being secured to the central portion of the roof panel, the second flange of the rail inner extending downwardly from the first flange thereof, the third flange of the rail inner extending downwardly and outwardly from the second flange thereof, and the fourth flange of the rail inner extending outwardly from the third flange thereof and having an extreme outer edge of the rail inner projecting therefrom and secured to the extreme outer edge of the roof panel side edge portion to cooperatively provide edge support to the roof panel; a side door mounted for movement between open and closed positions with respect to the side door opening and including a window frame that overlies the roof rail in the door closed position; and resilient means extending between the outer side of the roof panel edge portion and the door window frame when the door is in closed position to seal the door opening and to also provide a concealed rain gutter.

11. A vehicle body roof construction comprising: a roof panel including a central portion and a rear edge portion defining the upper periphery of a tailgate opening; said rear edge portion including first, second, and third integrally connected flanges that cooperate to give the edge portion a downwardly and outwardly extending configuration with respect to the vehicle body; said flanges having downwardly and outwardly extending orientations so as to permit the roof panel to be stamped by a straight draw process; the first roof panel rear edge flange extending downwardly from the central portion of the roof panel, the second rear edge flange extending outwardly from the first rear edge flange, and the third rear edge flange extending downwardly and outwardly from the second rear edge flange and having an extreme outer edge of the roof panel extending therefrom; a header inner having first, second, third, and fourth integrally connected flanges for cooperating with the flanged roof panel edge portion to define an enclosed cross section and provide a tailgate header; the first header inner flange being secured to the central portion of the roof panel, the second flange of the header inner extending downwardly from the first flange thereof, the third flange of the header inner extending downwardly and outwardly from the second flange thereof, and the fourth flange of header inner extending outwardly from the third flange thereof and having an extreme outer edge of the roof panel projecting therefrom and secured to the extreme outer edge of the roof rear edge portion to cooperatively provide rear edge support to the roof panel; a tailgate movable in a lift gate mode between open and closed positions with respect to the tailgate opening and including a window frame that overlies the rear header in the tailgate closed position; and a resilient seal mounted on the rear tailgate header and engaged with the tailgate window frame in the tailgate closed position so as to both seal the tailgate opening and provide a concealed rain gutter.

12. A vehicle body roof construction comprising: a roof panel including a first edge portion for defining the upper extremity of a longitudinal opening and a second edge portion that has a juncture with the first edge portion and defines a lateral side extremity of the roof; a pillar for supporting the roof panel at the juncture of the edge portions thereof and including pillar inner and outer members that define an enclosed chamber; each of said pillar members including first and second portions that respectively project along the first and second edge portions of the roof panel in a spaced relationship to each other; said first and second projecting pillar portions including depressions where the pillar inner and outer members are interengaged along the cross sections of the projecting portions and welded to each other in a spaced relationship from the juncture of the roof panel edge portions so as to enclose the chamber defined between the pillar members and to provide a pillar capable of interconnecting a header member along the first roof panel edge portion and a roof rail member along the second edge portion of the roof panel without requiring the pillar inner member to have any access welding holes.

13. A roof construction as in claim 12 wherein the first edge portion is at the front of the roof panel and defines the upper periphery of a windshield opening.

14. A roof construction as in claim 13 wherein the pillar outer member completely encircles the windshield opening, the portion of the pillar outer member projecting along the front edge portion of the roof panel cooperating therewith to provide a windshield header.

15. A roof construction as in claim 13 which includes a roof rail inner that cooperates with the second roof panel edge portion to provide a roof rail, said roof rail inner having a front end welded to the portions of the pillar inner and outer members projecting along the second edge portion.

16. A roof construction as in claim 13 which includes a header inner integral with the pillar outer and cooperating with the first edge portion to provide a windshield header.

17. A roof construction as in claim 12 wherein the first edge portion is at the rear of the roof panel and defines the upper periphery of a rear tailgate opening.

18. A roof construction as in claim 17 which includes a roof rail inner that cooperates with the second roof panel edge portion to provide a roof rail, said roof rail inner having a rear end welded to the portions of the pillar inner and outer members projecting along the second edge portion.

19. A roof construction as in claim 18 which includes a close-out panel covering the second edge portion.

20. A vehicle body roof construction comprising: a roof panel including a front edge portion for defining the upper extremity of a windshield opening and a side edge portion that has a juncture with the front edge portion and defines the upper extremity of a side door opening; a pillar for supporting the roof panel at the juncture of the edge portions thereof and including pillar inner and outer members defining an enclosed chamber; each of said pillar members including first and second portions that respectively project along the front and side edge portions of the roof panel in a spaced relationship to each other to provide a windshield header portion and a side roof rail portion; the projecting portions of the pillar outer member including depressions where the pillar inner and outer members engage each other along the cross sections of the projecting portions and are welded to each other in a spaced relationship from the juncture of the roof panel edge portions so as to enclose the chamber defined between the pillar members and to provide a pillar capable of interconnecting a header member along the front edge portion and a roof rail member along the side edge portion without requiring the pillar inner member to have any access welding holes.

21. A roof construction as in claim 20 wherein the side roof panel edge portion includes integrally connected flanges that give the side edge portion a downwardly and outwardly extending configuration; said flanges having downwardly and outwardly extending orientations so as to permit the roof panel to be stamped by a straight draw process; a side door mounted for movement between open and closed positions with respect to the side door opening and including a window frame that overlies the roof panel side edge portion in the closed position thereof; and resilient means extending between the roof panel side edge portion and the door window frame in the door closed position to seal the door opening and provide a concealed rain gutter.

22. A vehicle body roof construction comprising: a roof panel including a rear edge portion for defining the upper extremity of a rear tailgate opening and a side edge portion that has a juncture with the rear edge portion and defines the upper extremity of a side window opening; a pillar for supporting the roof panel at the juncture of the edge portions and including pillar inner and outer members defining an enclosed chamber; each of said pillar members including first and second portions that respectively project along the rear and side edge portions of the roof panel in a spaced relationship to each other; said pillar outer member including depressions where the pillar inner and outer members are interengaged and welded to each other along the cross sections of the projecting pillar portions in a spaced relationship from the juncture of the roof panel edge portions so as to enclose the chamber defined between the pillar members to provide a pillar capable of interconnecting a header member along the rear edge portion and a roof rail member along the side edge portion of the roof panel without requiring the pillar inner member to have any access welding holes.

23. A roof construction as in claim 22 wherein the roof panel side edge portion includes integrally connected flanges, a roof rail inner that cooperates with the flanged roof panel side edge portion to provide a roof rail, and a close-out panel covering the flanged roof panel side edge portion.

24. A vehicle body roof construction comprising: a roof panel including a side edge portion that defines the upper extremity of a side door opening and front and rear edge portions that have respective junctures with the side edge portion and define the upper extremities of front windshield and rear tailgate openings; front and rear pillars for supporting the roof panel at the juncture of the side edge portion with the front and rear edge portions; each pillar including pillar inner and outer members defining an enclosed chamber and having portions that project along the side edge portion and the other edge portion at the adjacent juncture in a spaced relationship to each other; the projecting portions of each pillar outer member including depressions where the pillar inner and outer members are interengaged and welded to each other along the cross sections of the projecting pillar portions in a spaced relationship to the adjacent roof panel edge portion juncture so as to enclose the chamber between the pillar members; front and rear header inner members connected to the pillar outer members of the front and rear pillars and respectively cooperating with the front and rear roof panel edge portions to provide windshield and tailgate opening headers; said roof panel side edge portion including integrally connected flanges that have outwardly and downwardly extending orientations so as to permit the roof panel to be stamped by a straight draw process; a roof rail inner that cooperates with the flanged roof panel side edge portion to provide a side roof rail; said roof rail being connected to the projecting pillar portions along the roof panel side edge portion; a side door mounted for movement between open and closed positions with respect to the door opening and having a window frame that overlies the flanged roof panel side edge portion in the door closed position; and resilient means extending between the roof panel side edge portion and the window frame in the door closed position to provide a sealed door opening and a concealed rain gutter.

* * * * *

UNITED STATES PATENT OFFICE
CERTIFICATE OF CORRECTION

Patent No. 4,036,522                    Dated July 19, 1977

Inventor(s) Delbert D. DeRees and Jacques Emile Pinsonneault

It is certified that error appears in the above-identified patent and that said Letters Patent are hereby corrected as shown below:

Column 1, line 59 "wleding" should be --welding--.

Column 2, line 28 "rail" should be --rain--.

Column 2, line 49 "rail" should be --rain--.

Column 3, line 44 "8-of" should be --8-8 of--.

Column 4, line 24 "recieving" should be --receiving--.

Column 5, line 33 "recieves" should be --receives--.

Column 8, line 44 "mans" should be --means--.

Signed and Sealed this

Twenty-ninth Day of November 1977

[SEAL]

Attest:

RUTH C. MASON  
Attesting Officer

LUTRELLE F. PARKER  
Acting Commissioner of Patents and Trademarks